（12） United States Patent
Wiesner

(10) Patent No.: US 8,278,362 B2
(45) Date of Patent: Oct. 2, 2012

(54) METHOD OF COMBINING EXISTING CHEMICAL PROCESSES TO PRODUCE HYDROCARBON FUELS

(76) Inventor: Barak Leland Wiesner, Redondo Beach, CA (US)

( * ) Notice: Subject to any disclaimer, the term of this patent is extended or adjusted under 35 U.S.C. 154(b) by 459 days.

(21) Appl. No.: 12/547,347

(22) Filed: Aug. 25, 2009

(65) Prior Publication Data

US 2011/0054046 A1 Mar. 3, 2011

(51) Int. Cl.
*C07C 27/00* (2006.01)
(52) U.S. Cl. ......... 518/700; 518/702; 518/704; 518/705
(58) Field of Classification Search .................. 518/700, 518/702, 704, 705
See application file for complete search history.

(56) References Cited

U.S. PATENT DOCUMENTS

| 2006/0211777 A1* | 9/2006 | Severinsky | 518/702 |
| 2009/0289227 A1* | 11/2009 | Rising | 252/373 |
| 2011/0041688 A1* | 2/2011 | Eisenberger | 95/107 |

* cited by examiner

*Primary Examiner* — Jafar Parsa
(74) *Attorney, Agent, or Firm* — Cicero Patent Services PLLC; Michael Cicero

(57) ABSTRACT

A method for producing hydrocarbon fuels from environmentally friendly non-petroleum based sources using existing chemical reactions is disclosed. In this method, air is passed through a reactor containing amine and carbon dioxide mixture to produce carbon dioxide. The reactor containing amine and carbon dioxide mixture, a Sabatier reactor, a partial oxidation reactor and a Fischer-Tropsch reactor are in thermal contact with each other. Heat derived from the exothermic reactions is used to release carbon dioxide from the amine-carbon dioxide mixture. The resulting hydrocarbon fuel products are separated from the Fischer-Tropsch reactor and sold.

16 Claims, 4 Drawing Sheets

METHOD OF COMBINING EXISTING CHEMICAL PROCESSES TO PRODUCE HYDROCARBON FUELS

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to production of hydrocarbon fuels from environmentally friendly non-petroleum based sources, and more particularly to a method of combining existing chemical processes to produce hydrocarbon fuels.

DISCUSSION OF RELATED ART

It has been recognized globally that the hydrocarbon industries are aimed at reducing energy consumption and decreasing harmful emissions to meet the environmental standards. The hydrocarbon industry is facing an increased pressure to reduce green house gas emission and global warming. But with world's increasing dependence on road transportation, the need to develop hydrocarbon fuels has become a major concern. So the large scale production of the hydrocarbon fuels from renewable source of energy is required. Various methods have been devised for the production of hydrocarbons. Nuclear energy may also be used to power the production of hydrocarbons which is often considered as an environmentally friendly source.

U.S. Pat. No. 4,833,170 issued to Agee on May 23, 1989 discloses a process and apparatus for the production of heavier hydrocarbons from one or more gaseous hydrocarbons with low molecular weight. The process comprises reacting the gaseous light hydrocarbons by autothermal reforming with air in the presence of recycled carbon dioxide and steam to produce a syngas. The syngas is then reacted in the presence of a hydrocarbon synthesis catalyst containing cobalt to form heavier hydrocarbons and water. The heavier hydrocarbons and water are separated, and the resulting residue gas stream is subjected to catalytic combustion with additional air to form a product stream comprising carbon dioxide and nitrogen. The carbon dioxide is separated from the nitrogen to produce a nitrogen product stream, and at least a portion of the separated carbon dioxide is recycled to the autothermal reforming step. The above process requires significant capital equipment and energy costs attributable to compression of the inlet air. The inlet air requiring compression contains substantial quantities of nitrogen that remain essentially chemically inert as the nitrogen passes through the process, ultimately exiting the process in the residue gas. Furthermore, although the residue gas has a significant chemical-energy fuel value attributable to the carbon monoxide, hydrogen, methane and heavier hydrocarbon components thereof, the residue gas is very dilute, having a low heating value that renders it very difficult and costly to recover the energy of the fuel value of the residue gas with high efficiency.

U.S. Pat. No. 4,833,170 issued to Agee on May 23, 1989 discloses a process and apparatus for the production of heavier hydrocarbons from one or more gaseous hydrocarbons with low molecular weight. The process comprises reacting the gaseous light hydrocarbons by autothermal reforming with air in the presence of recycled carbon dioxide and steam to produce a syngas. The syngas is then reacted in the presence of a hydrocarbon synthesis catalyst containing cobalt to form heavier hydrocarbons and water. The heavier hydrocarbons and water are separated, and the resulting residue gas stream is subjected to catalytic combustion with additional air to form a product stream comprising carbon dioxide and nitrogen. The carbon dioxide is separated from the nitrogen to produce a nitrogen product stream, and at least a portion of the separated carbon dioxide is recycled to the autothermal reforming step. The above process requires significant capital equipment and energy costs attributable to compression of the inlet air. The inlet air requiring compression contains substantial quantities of nitrogen that remain essentially chemically inert as the nitrogen passes through the process, ultimately exiting the process in the residue gas. Furthermore, although the residue gas has a significant chemical-energy fuel value attributable to the carbon monoxide, hydrogen, methane and heavier hydrocarbon components thereof, the residue gas is very dilute, having a low heating value that renders it very difficult and costly to recover the energy of the fuel value of the residue gas with high efficiency.

An autothermal reformer, a Fischer-Tropsch reactor and a Brayton cycle that are structurally and functionally integrated is disclosed in U.S. Pat. No. 5,733,941 issued to Waycuilis on Mar. 31, 1998. The synthesis gas is fed to the Fischer-Tropsch reactor where it is catalytically reacted to produce heavy hydrocarbons. The outlet from the Fischer-Tropsch reactor is separated into water, a low heating value tail gas, and the desired hydrocarbon liquid product. The water is pressurized and heated to generate process steam. The tail gas is heated and fed with compressed air and steam to the Brayton cycle having a combustor and a series of power turbines and compressors. The tail gas and air feed are burned in the combustor to produce a combustion gas that is used to drive a power turbine linked by a shaft to an air compressor, thereby driving the air compressor. The heat from the reformer is passed through a plurality of heat exchangers that enable heat to be recovered from the outlet of the autothermal reformer. The recovered heat is used to make the process steam as well as to preheat the hydrocarbon feed gas before it is fed to the autothermal reformer, preheat the synthesis gas before it is fed to the Fischer-Tropsch reactor and preheat the tail gas before it is fed to the combustor. Although the tail gas is used for power generation, there is still the need of high pressure steam generation from the heat of the reformer. Clearly the use of supplemental fuel reduces the overall carbon efficiency of the gas-to-liquids process and the necessity to provide steam generation adds to the cost of the plant.

U.S. Pat. No. 6,172,124 issued to Wolflick on Jan. 9, 2001 includes a process for converting a hydrocarbon gas to syngas which, in turn, is converted into a liquid hydrocarbon product wherein a substantial amount of the heat generated in the process is recovered for use in generating steam needed in the process or for conversion into mechanical energy. Further, tail gas produced by the process is used to fuel the gas turbine which, in turn, is used to power the compressors needed for compressing the air used in the process. By using tail gas to fuel the gas turbine, less of the compressed combustion-air is needed to cool the combustion gases in the turbine and, instead, can be used to provide a portion of the process-air required in the process; thereby possibly saving up to 20 to 30 percent of the horsepower otherwise needed to compress the required volume of process-air. In this process, the heat from the syngas product stream must be recovered in a system of heat exchangers and used for steam generation. While the use of a gas heated reformer for production of syngas offers the potential for reducing the steam generation plant required, the overall power requirements of the gas-to-liquids process usually require that steam generation plant is provided for generation of power by means of steam turbines etc. Such steam generation plant may be fueled by the Fischer-Tropsch tail gas, supplemented with another fuel source.

Therefore, there is a need of a method that allows for the combination of existing chemical processes to produce hydrocarbon fuels with higher overall efficiency than existing methods. In such a method, heat derived from exothermic chemical reactions would be used to release carbon dioxide from a carbon dioxide rich solution, and the carbon dioxide released would be then utilized by at least one chemical reaction. Further, this preferred process would be used for navies to produce their own jet fuel from nuclear reactors on aircraft carriers. This would negate the need to support fleets of fueling ships. Moreover, in such a method the net energy input to create the fuels would derive from environment friendly non-petroleum based sources. The present invention accomplishes these objectives.

SUMMARY OF THE INVENTION

The present invention is a method for producing hydrocarbon fuels from environmentally friendly non-petroleum based sources. Air is passed through a blower containing amine to absorb carbon dioxide from the air and form a mixture of amine and carbon dioxide. A reactor containing amine and carbon dioxide mixture is heated to release the carbon dioxide. Another method used for the production of carbon dioxide is to flow air through a molecular sieve adsorber. The carbon dioxide is adsorbed from the air passed through the molecular sieve adsorber and is released by heating the molecular sieve adsorber. Water from a reservoir is piped to an electrolyzer for electrochemically producing hydrogen and oxygen. The electrochemically produced hydrogen and the carbon dioxide obtained by heating the reactor containing the amine and carbon dioxide mixture are used in a Sabatier reactor. An exothermic reaction taking place in the Sabatier reactor creates methane and water or steam according to the Sabatier reaction. The methane and water obtained from the Sabatier reaction is separated with a condenser and the water is piped to the electrolyzer for hydrogen production and the methane is supplied to a partial oxidation reactor. The methane supplied to the partial oxidation reactor combines with oxygen emanated from the electrolyzer to produce syngas, a mixture of carbon monoxide and hydrogen.

The syngas piped to a Fischer-Tropsch reactor combines with the electrochemically produced hydrogen from the electrolyzer. Heat derived from the exothermic chemical reactions is used to release carbon dioxide from a carbon dioxide rich solution, and the carbon dioxide released would be then utilized by at least one chemical reaction. In a preferred embodiment, the carbon dioxide rich solution is amine. The resulting hydrocarbon fuel products are to be separated and then sold.

The present invention facilitates a method of combining existing chemical reactions to produce hydrocarbon fuels more efficiently than can otherwise be done. Further in such a method, the energy required to create the hydrocarbon fuels comes from environmentally friendly non-petroleum based green sources. Moreover, the method for producing hydrocarbon fuels from environmentally friendly non-petroleum based sources provides economically produced hydrocarbon fuels that have a closed carbon cycle without contributing to global warming. The hydrocarbon fuels can be produced by combining the existing chemical reactions with heat transfer mechanisms. A shell and tube heat exchanger is one possible heat transfer mechanism. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
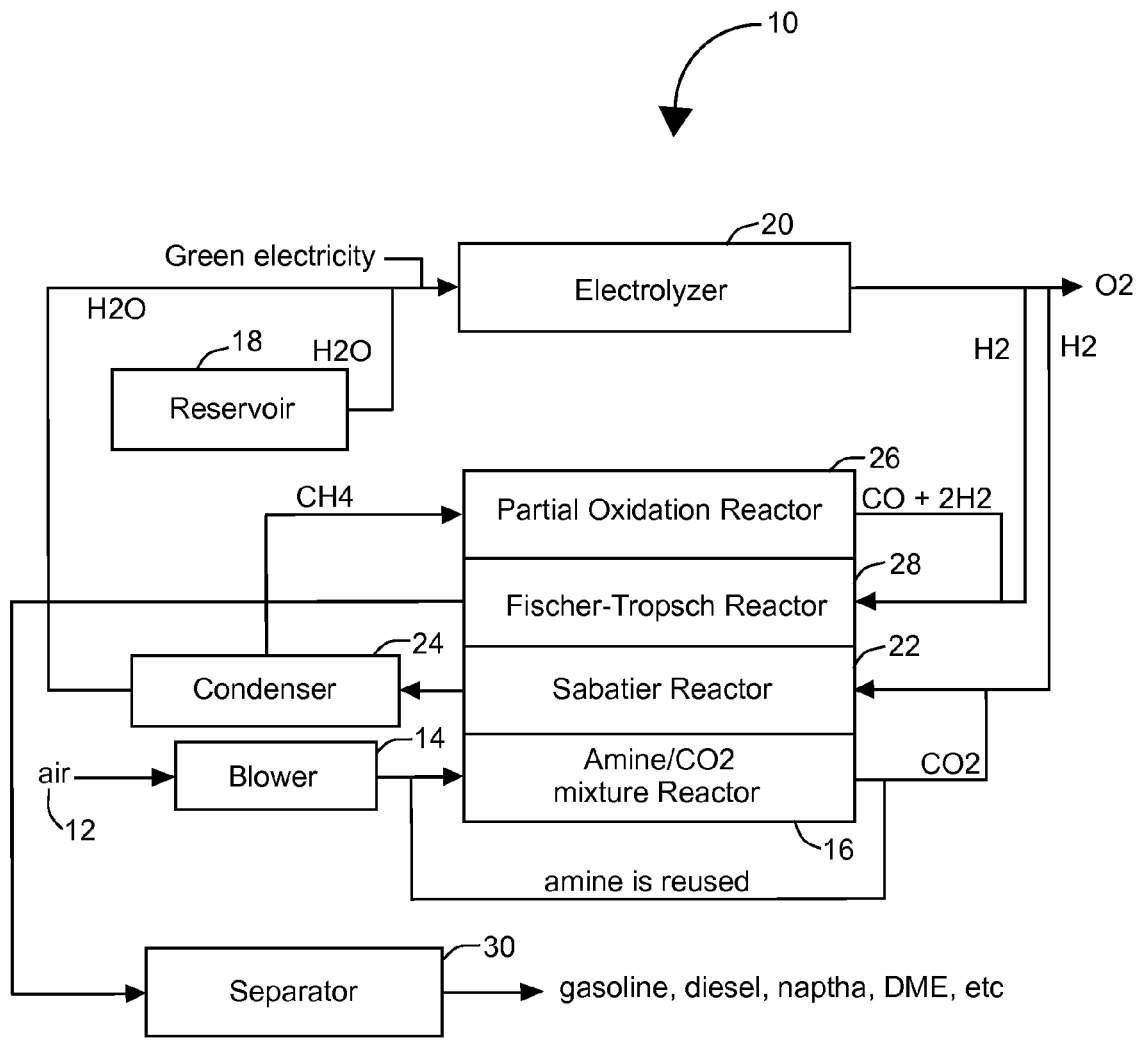
FIG. 1 is a process flowchart of the invention, illustrating a method for producing hydrocarbon fuels from environmentally friendly non-petroleum based sources.

FIG. 1 is a process chart 10 showing a method for producing hydrocarbon fuels from environmentally friendly non-petroleum based sources. Referring to FIG. 1, air 12 is passed through a blower 14 through an amine (not shown) to absorb carbon dioxide from the air 12 and form a mixture of amine and carbon dioxide. A reactor 16 containing amine and carbon dioxide mixture when heated releases the carbon dioxide and the amine (not shown) can be reused for the production of carbon dioxide. Another method used for the production of carbon dioxide is to flow air (not shown) through a molecular sieve adsorber (not shown). The carbon dioxide is adsorbed from the air (not shown) passed through the molecular sieve adsorber (not shown) and is released by heating the molecular sieve adsorber (not shown). Exhaust gas from a coal plant (not shown) or gas power plant (not shown) or the like are rich in carbon dioxide and can be used to produce carbon dioxide after removing sulphur from the carbon dioxide stream before use. For the production of carbon dioxide other methods of carbon dioxide capture also exists.

Water from a reservoir 18 is piped to an electrolyzer 20 for electrochemically producing hydrogen and oxygen. The reaction is as follows:

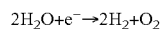

$2H_2O + e^- \rightarrow 2H_2 + O_2$

The electrochemically produced hydrogen and the carbon dioxide obtained by heating the reactor 16 containing amine and carbon dioxide mixture are used in a Sabatier reactor 22. An exothermic reaction taking place in the Sabatier reactor 22 creates methane and water or steam according to the Sabatier reaction. The Sabatier reaction may be stated as follows:

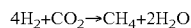

$4H_2 + CO_2 \rightarrow CH_4 + 2H_2O$

The methane and water obtained from the Sabatier reaction is separated with a condenser 24 and the water is piped to the electrolyzer 20 for hydrogen production and the methane is supplied to a partial oxidation reactor 26.

The methane supplied to the partial oxidation reactor 26 combines with oxygen from the electrolyzer 20 to produce syngas a mixture of carbon monoxide and hydrogen. The partial oxidation reaction may be as follows:

$$CH_4 + (1/2)O_2 \rightarrow CO + 2H_2$$

The syngas piped to a Fischer-Tropsch reactor 28 combines with the electrochemically produced hydrogen from the electrolyzer 20. Heat released from the Sabatier reaction, the Fischer-Tropsch reaction, and the partial oxidation reaction, all of which are exothermic, is utilized to liberate heat from the amine and carbon dioxide mixture that absorbs heat from at least one exothermic reaction. The liberated carbon dioxide is then directed into the Sabatier reactor 22. The resulting hydrocarbon fuels are separated by passing through a separator 30 and sold.

The Fischer-Tropsch reaction may be as follows:

$$(2n+1)H_2 + nCO \rightarrow CnH(2n+2) + nH_2O$$

In the process chart 10, the reactor 16 containing amine and carbon dioxide mixture, the Sabatier reactor 22, the partial oxidation reactor 26 and the Fischer-Tropsch reactor 28 are placed in thermal contact with each other. The heat from the Sabatier reactor 22, the Fischer-Tropsch Reactor, and the partial oxidation reactor 26 can be used to heat the reactor 16 containing amine and carbon dioxide mixture to liberate carbon dioxide. The energy required to produce the hydrocarbon fuels can be from environmentally friendly non-petroleum based sources or green sources. The method of combining existing chemical reactions to produce hydrocarbon fuels provides economically produced hydrocarbon fuels that have a closed carbon cycle without contributing to global warming.

Figure 2:
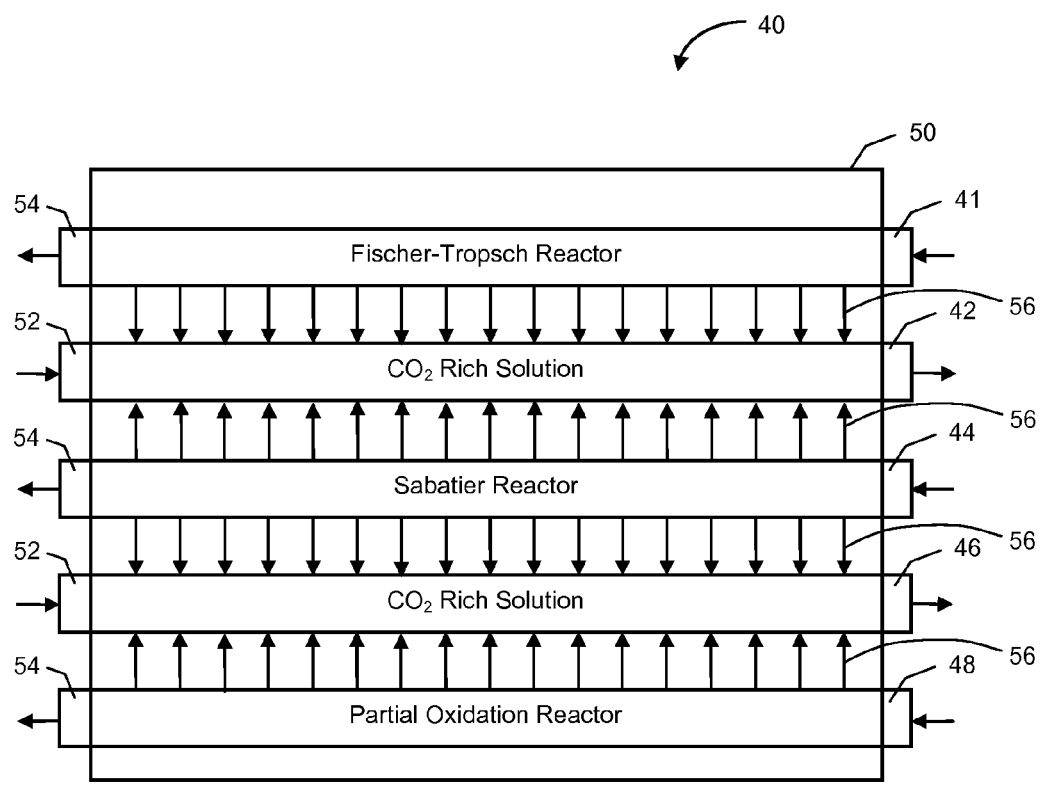
FIG. 2 is an axial cross-sectional view of a configuration of the invention, illustrating separate tubes placed next to each other transferring heat from exothermic reactions to endothermic reactions.

FIG. 2 illustrates an axial cross-sectional view of a configuration 40 of the method for producing hydrocarbon fuels from environmentally friendly non-petroleum based sources. The configuration 40 comprises of a common reactor 50 having a plurality of tubes 41, 42, 44, 46, 48. Reactants (not shown) are pumped through an end 52 of the plurality of tubes 41, 42, 44, 46, 48 and the resulting products (not shown) leave through another end 54 of the plurality of tubes 41, 42, 44, 46, 48. The plurality of tubes 41, 42, 44, 46, 48 of the common reactor 50 are placed next to each other so that heat 56 from the exothermic reactions is transferred through walls (not shown) of the plurality of tubes 41, 42, 44, 46, 48 of the common reactor 50 to the carbon dioxide rich solution at a predetermined location of tube 42 and/or tube 46 in order to liberate carbon dioxide from the solution for use within at least one of the exothermic reactions. The configuration 40 can be a conventional shell and tube heat exchanger where at least one of the reactions fills the interstitial spaces between the plurality of tubes 41, 42, 44, 46, 48. The plurality of tubes 41, 42, 44, 46, 48 can be placed next to each other in any order.

Figure 3:
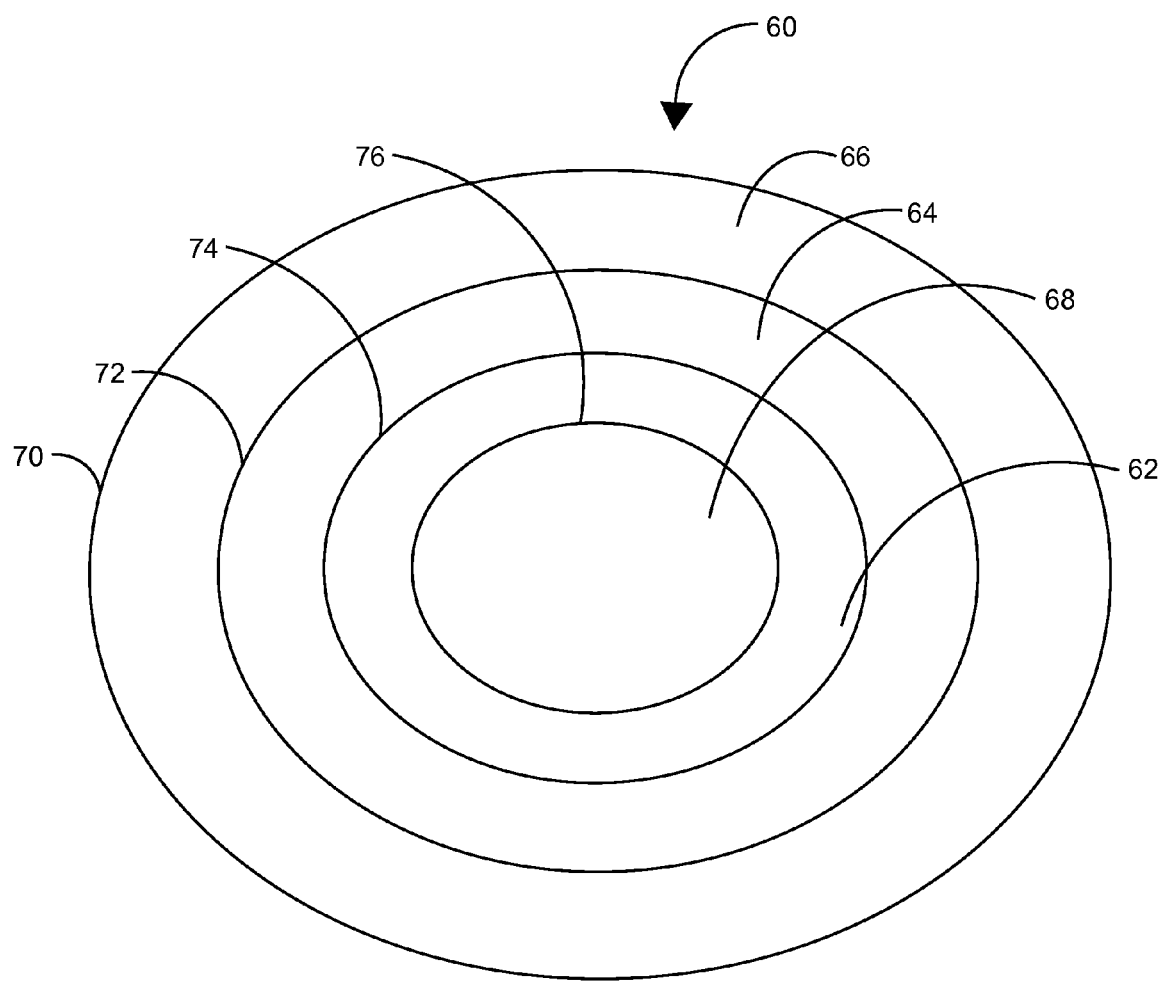
FIG. 3 is a transverse cross sectional view of another configuration of the invention, illustrating concentric tubes combined to transfer heat from exothermic reactions to endothermic reactions through walls of the concentric tubes.

FIG. 3 shows a transverse cross-sectional view of another configuration 60 of the method for producing hydrocarbon fuels. The configuration 60 uses combination of a plurality of concentric tubes 62, 64, 66, 68. Heat is transferred from exothermic reactions to a carbon dioxide rich solution within at least one of tubes 62, 64, 66, and 68 at a predetermined location in order to liberate carbon dioxide from the solution for use within at least one of the exothermic reactions. In one embodiment, the plurality of concentric tubes includes a Sabatier reactor 62, a partial oxidation reactor 64, a reactor 66 containing amine and carbon dioxide mixture and a Fischer-Tropsch reactor 68. The exothermic reactions include a Sabatier reaction taking place in the Sabatier reactor 62, a Fischer-Tropsch reaction taking place in the Fischer-Tropsch reactor 68, and a partial oxidation reaction taking place in the partial oxidation reactor 64. The heat produced by the exothermic reactions is transferred through at least one of the walls 70, 72, 74 and 76. The Fischer-Tropsch reaction takes place under a high temperature created by the Sabatier reaction and the partial oxidation reaction. The Fischer-Tropsch reactor 68 provides hydrocarbon fuel products that are to be separated and then sold. In the configuration 60 the reactor 66 containing the amine and carbon dioxide mixture that may be an outer tube acts as a reaction vessel. The order of the plurality of concentric tubes is optional.

Figure 4:
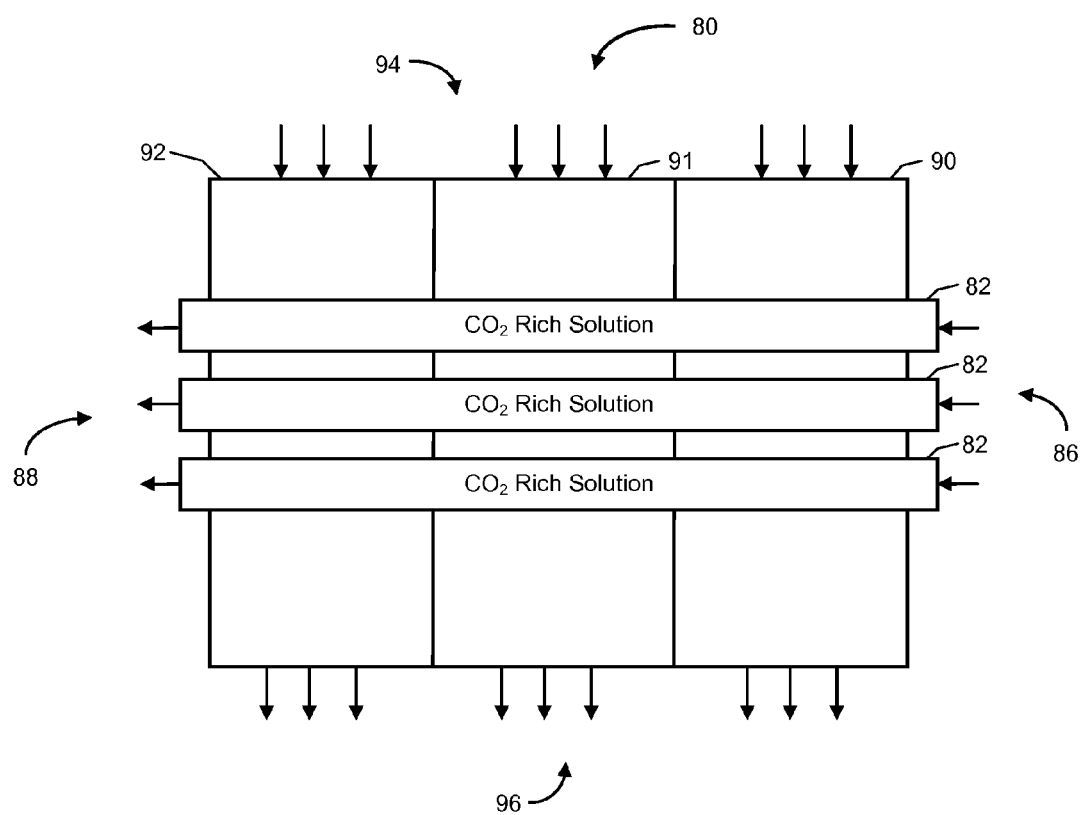
FIG. 4 is a top plan view of a yet another configuration of the invention, illustrating a complex cross-flow recuperator.

FIG. 4 illustrates a top plan view of a yet another configuration 80 of the method for producing hydrocarbon fuels from environmentally friendly non-petroleum based sources. The configuration 80 is a cross-flow type of heat exchanger. The cross-flow type of heat exchanger 80 comprises of a plurality of tubes 82 having a plurality of opposing ends 86, 88, and a plurality of chambers 90, 91, 92 having a plurality of other opposing ends 94, 96. The plurality of chambers 90, 91, 92 is placed adjacent to each other. A carbon dioxide rich solution enters the end 86 and absorbs heat in order to liberate carbon dioxide from the solution for use within at least one of the exothermic reactions prior to leaving the opposing end 88. Exothermic reactants (not shown) pass through the other opposing end 94 and resulting products (not shown) leave through the other opposing end 96. The exothermic reactions take place in a Sabatier reactor 90, a Fischer-Tropsch Reactor 91, and a partial oxidation reactor 92. The reactor 82 containing the carbon dioxide rich solution is placed perpendicular to the Sabatier reactor 90, the Fischer-Tropsch Reactor 91, and partial oxidation reactor 92 so that the heat (not shown) from the Sabatier reactor 90, the Fischer-Tropsch Reactor 91 and partial oxidation reactor 92 liberates carbon dioxide from the solution for use within at least one of the exothermic reactions.

While a particular form of the invention has been illustrated and described, it will be apparent that various modifications can be made without departing from the spirit and scope of the invention. For example, various types of configurations can be used and the order of reactions can be altered. Accordingly, it is not intended that the invention be limited, except as by the appended claims.

What is claimed is:

1. A method for producing hydrocarbon fuels from environmentally friendly non-petroleum based sources, comprising:
    a) blowing air through a solution to absorb carbon dioxide from the air;
    b) producing hydrogen and oxygen;
    c) passing the carbon dioxide and hydrogen to a Sabatier reactor to produce methane and water;
    d) condensing the water from the methane;
    e) combining the oxygen and methane in a partial oxidation reactor to yield syngas; and
    f) supplying the syngas to a Fischer-Tropsch reactor to produce a mixture of hydrocarbon fuels;
       wherein at least one of the Sabatier reactor, the partial oxidation reactor, and the Fischer-Tropsch reactor are in thermal contact with the solution such that at least some of the heat released by the exothermic reactions liberates carbon dioxide from the solution.

2. The method of claim 1 wherein the solution is an amine and the amine absorbs carbon dioxide from the air to form an amine and carbon dioxide mixture.

3. The method of claim 2 wherein the carbon dioxide is released on heating the amine and carbon dioxide mixture.

4. The method of claim 1 wherein after releasing the carbon dioxide from the solution, the solution may be reused to absorb the carbon dioxide from the air.

5. The method of claim 1 wherein at least one exothermic reaction takes place in the Sabatier reactor, the Fischer-Tropsch reactor, and partial oxidation reactor.

6. The method of claim 5 wherein the exothermic reaction may be a Sabatier reaction, a Fischer-Tropsch reaction, and a partial oxidation reaction are exothermic.

7. The method of claim 1 wherein the water condensed from the methane is piped to an electrolyzer to yield hydrogen and oxygen.

8. The method of claim 1 wherein the oxygen used in the partial oxidation reactor is obtained by electrolysis of water.

9. The method of claim 1 wherein the hydrogen used in the Fischer-Tropsch reactor and Sabatier reactor is obtained from an electrolyzer.

10. The method of claim 1 wherein the syngas is a mixture of carbon monoxide and hydrogen.

11. The method of claim 1 wherein heat from at least one of the Sabatier reaction, the Fischer-Tropsch reaction, and partial oxidation reaction may also be used to heat the solution to liberate the carbon dioxide.

12. The method of claim 1 wherein the hydrocarbon fuels are separated from the Fischer-Tropsch reactor.

13. The method of claim 12 wherein the produced hydrocarbon fuels have a closed carbon cycle.

14. The method of claim 12 wherein the hydrocarbon fuel may be least one of jet fuel, diesel fuel, gasoline, kerosene, dimethylether, naphtha or any combination thereof.

15. The method of claim 1 wherein the air comprises exhaust gases.

16. A method for producing hydrocarbon fuels, comprising:
   a) blowing air through a solution to absorb carbon dioxide from the air;
   b) producing hydrogen and oxygen;
   c) passing the carbon dioxide and hydrogen to a Sabatier reactor to produce methane and water;
   d) condensing the water from the methane;
   e) combining the oxygen and methane in a partial oxidation reactor to yield syngas; and
   f) supplying the syngas to a Fischer-Tropsch reactor to produce a mixture of hydrocarbon fuels;
      wherein at least one of the Sabatier reactor, the partial oxidation reactor, and the Fischer-Tropsch reactor are geometrically arranged such that at least some of the heat released by the exothermic reactions transfers naturally by heat conduction through system boundaries and liberates carbon dioxide from the solution.

* * * * *